United States Patent
Kim et al.

(10) Patent No.: US 9,290,655 B2
(45) Date of Patent: Mar. 22, 2016

(54) POLYCARBONATE RESIN COMPOSITION HAVING GOOD CHEMICAL RESISTANCE

(71) Applicant: Cheil Industries Inc., Gumi-si (KR)

(72) Inventors: Jung Ki Kim, Uiwang-si (KR); Eun Taek Woo, Uiwang-si (KR); Na Ri Park, Uiwang-si (KR); Jae Hyun Han, Uiwang-si (KR); Jong Cheol Lim, Uiwang-si (KR)

(73) Assignee: Cheil Industries Inc., Gumi-si (KR)

( * ) Notice: Subject to any disclaimer, the term of this patent is extended or adjusted under 35 U.S.C. 154(b) by 0 days.

(21) Appl. No.: 14/291,023

(22) Filed: May 30, 2014

(65) Prior Publication Data

US 2015/0057390 A1    Feb. 26, 2015

(30) Foreign Application Priority Data

Aug. 23, 2013 (KR) .................. 10-2013-0100158

(51) Int. Cl.
| | |
|---|---|
| *C08L 69/00* | (2006.01) |
| *C08L 51/06* | (2006.01) |
| *C08L 25/06* | (2006.01) |

(52) U.S. Cl.
CPC ............. *C08L 69/00* (2013.01); *C08L 2205/03* (2013.01); *C08L 2207/53* (2013.01)

(58) Field of Classification Search
None
See application file for complete search history.

(56) References Cited

U.S. PATENT DOCUMENTS

| | | | |
|---|---|---|---|
| 4,188,314 A | 2/1980 | Fox et al. | |
| 6,010,974 A | 1/2000 | Kim et al. | |
| 6,093,768 A * | 7/2000 | Nakano et al. | ................. 524/504 |
| 6,284,700 B1 | 9/2001 | Lyu et al. | |
| 2001/0025082 A1* | 9/2001 | Park | ................................ 525/63 |
| 2007/0213435 A1* | 9/2007 | Min et al. | ....................... 524/121 |

* cited by examiner

*Primary Examiner* — Jeffrey Mullis
(74) *Attorney, Agent, or Firm* — Additon, Higgins & Pendleton, P.A.

(57) ABSTRACT

A polycarbonate resin composition includes (A) a polycarbonate resin, (B) syndiotactic polystyrene, and (C) modified polyolefin compound including a polar functional group on a polyolefin backbone. The polycarbonate resin compositions can have excellent chemical resistance, impact resistance, weathering resistance, fatigue resistance, thermal stability, mechanical properties, transparency, and/or molding processability.

10 Claims, No Drawings

POLYCARBONATE RESIN COMPOSITION
HAVING GOOD CHEMICAL RESISTANCE

CROSS-REFERENCE TO RELATED
APPLICATIONS

This application claims priority under 35 U.S.C. §119 to Korean Patent Application No. 10-2013-0100158, filed on Aug. 23, 2013, in the Korean Intellectual Property Office, the disclosure of which is incorporated herein by reference in its entirety.

TECHNICAL FIELD

The following disclosure relates to a thermoplastic resin composition. More particularly, the following disclosure relates to a polycarbonate resin composition that can have good chemical resistance, impact resistance, and/or molding processability.

BACKGROUND

A polycarbonate resin is a polymer material having good transparency, impact strength, and molding processability, and is widely used as an exterior material of portable electronic devices. Recently, it is common to adopt a large display window for a portable electronic device such as a mobile phone in response to the popularization of smartphones. A mobile phone in which a display is supported by a general metal bracket can be prepared by insert molding to integrate the metal bracket by surrounding the metal bracket through plastic injection molding.

In insert molding, a polycarbonate resin composition is positioned along a border part, and surrounds the border of the metal bracket. Thus, it is vulnerable to impact resistance and fatigue resistance as stress is concentrated. In particular, a portable electronic device is frequently exposed to chemical products including various cosmetics, and the like by frequent touch due to its nature. Thus, it is problematic that the physical properties such as the mechanical properties and impact strength of a polycarbonate resin composition are degraded by the chemical products.

In order to solve such problems, U.S. Pat. No. 4,188,314 discloses a shaped article having enhanced chemical resistance, including polycarbonate and copolyester derived from isophthalic acid, terephthalic acid, and 1,4-cyclohexanedimethanol. However, its mechanical properties can be poor, and sufficient impact strength may not be obtained.

Therefore, there is a need for a polycarbonate resin composition having excellent chemical resistance and fatigue resistance, while maintaining the mechanical properties such as tensile strength and impact strength, and the inherent properties such as dimensional stability, thermal resistance, transparency, and molding processability of a polycarbonate resin.

SUMMARY

An embodiment of the present invention is directed to a polycarbonate resin composition that can have improved impact resistance, weathering resistance, fatigue resistance and/or thermal stability.

Another embodiment of the present invention is directed to a polycarbonate resin composition that is capable of preventing the degradation of the inherent properties of polycarbonate due to local stress caused by shrinkage in molding processing and/or maximizing molding processability and/or chemical resistance.

Another embodiment of the present invention is directed to a molded article that can have good chemical resistance, impact resistance, weathering resistance, molding processability, thermal stability, transparency and/or mechanical properties.

A polycarbonate resin composition that can have good chemical resistance includes (A) a polycarbonate resin, (B) syndiotactic polystyrene, and (C) a modified polyolefin compound including a polar functional group on a polyolefin backbone.

The polycarbonate resin composition may include about 88% by weight (wt %) to about 98 wt % of a polycarbonate resin (A), about 1 wt % to about 10 wt % of aromatic syndiotactic polystyrene (B), and about 0.1 wt % to about 2.5 wt % of a modified polyolefin compound (C) including a polar functional group on the polyolefin backbone.

The polyolefin backbone may include any one or more selected from the group consisting of polyethylene, polypropylene and ethylene-propylene copolymer.

The modified polyolefin compound (C) may be formed by grafting any one or more monomers selected from the group consisting of acrylic acid, methacrylic acid and acrylonitrile on the polyolefin backbone.

The modified polyolefin compound (C) may have a flow index of about 1 g/10 min to about 5 g/10 min (190° C., 2.16 kg).

The modified polyolefin compound (C) may contain the one or more monomers in amount of about 25 wt % to about 35 wt %.

The syndiotactic polystyrene (B) may have a syndiotacticity of about 97% to about 100%.

The polycarbonate resin composition may further include a core-shell graft copolymer.

The core-shell graft copolymer may include a core formed by polymerizing one or more materials selected from the group consisting of diene-based rubbers having 4 to 6 carbons, acrylate-based rubbers and silicone-based rubber monomers, and one or more materials selected from the group consisting of $C_1$-$C_8$ methacrylic acid alkyl esters, $C_1$-$C_8$ methacrylic acid esters, maleic anhydride, and $C_1$-$C_4$ alkyl and/or phenyl N-substituted maleimide grafted on the core.

The polycarbonate resin composition may further include an additive selected from the group consisting of an antimicrobial, a thermal stabilizer, an antioxidant, a release agent, a light stabilizer, an inorganic additive, a surfactant, a coupling agent, a plasticizer, a compatibilizer, a lubricant, an antistatic agent, a coloring agent, a pigment, a dye, a flame retardant, a flame retardant aid, an anti-dripping agent, a weathering agent, an ultraviolet absorbent, a sunscreen, and mixtures thereof.

In another general embodiment, a molded article is manufactured from the polycarbonate resin composition.

DETAILED DESCRIPTION

The present invention now will be described more fully hereinafter in the following detailed description of the invention, in which some, but not all embodiments of the invention are described. Indeed, this invention may be embodied in many different forms and should not be construed as limited to the embodiments set forth herein; rather, these embodiments are provided so that this disclosure will satisfy applicable legal requirements.

The inventors of the present invention have surprisingly found that chemical resistance, impact resistance, moldability, fatigue resistance, weathering resistance, and/or mechanical properties of a polycarbonate resin composition may be significantly improved by including a polycarbonate resin, syndiotactic polystyrene, and a modified polyolefin compound including a polar functional group on a polyolefin backbone.

Hereinafter, each component will be described in detail.

(A) Polycarbonate Resin

A polycarbonate resin may be used in the present invention to impart mechanical properties such as stiffness and impact strength, appearance characteristics such as transparency, and also good moldability and thermal resistance. The polycarbonate resin may be an aromatic polycarbonate resin, but is not limited thereto. Examples of the polycarbonate resin may include without limitation aliphatic polycarbonate resins, aromatic polycarbonate resins, copolycarbonate resins thereof, copolyestercarbonate resins, polycarbonate-polysiloxane copolymer resins, and the like, and mixtures thereof. The polycarbonate resin may also have a linear or branched structure.

The polycarbonate resin of the present invention may be prepared by reacting (a1) an aromatic dihydroxy compound with (a2) a carbonate precursor.

(a1) Aromatic Dihydroxy Compound

Examples of the aromatic dihydroxy compound (a1) may include without limitation a compound represented by following Chemical Formula 1 or a mixture thereof:

[Chemical Formula 1]

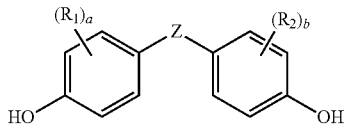

wherein, $R_1$ and $R_2$ are the same or different and are each independently hydrogen, halogen, or $C_1$-$C_8$ alkyl; a and b are the same or different and are each independently an integer of 0 to 4; and Z is a single bond, $C_1$-$C_8$ alkylene, $C_2$-$C_8$ alkylidene, $C_5$-$C_{15}$ cycloalkylene, $C_5$-$C_{15}$ cycloalkylidene, —S—, —SO—, $SO_2$—, —O— or —CO—.

Examples of aromatic dihydroxy compounds (a1) represented by Chemical Formula 1 may include without limitation bis(hydroxyaryl)alkanes, bis(hydroxyaryl) cycloalkanes, bis(hydroxyaryl)ethers, bis(hydroxyaryl)sulfides, bis(hydroxyaryl)sulfoxides, biphenyl compounds, and the like, which may be used alone or in mixture of two or more of them.

Examples of bis(hydroxyaryl)alkanes include without limitation bis(4-hydroxyphenyl)methane, bis(3-methyl-4-hydroxyphenyl)methane, bis(3-chloro-4-hydroxyphenyl)methane, bis(3,5-dibromo-4-hydroxyphenyl)methane, 1,1-bis(4-hydroxyphenyl)ethane, 1,1-bis(2-tertiary-butyl-4-hydroxy-3-methyl phenyl)ethane, 2,2-bis(4-hydroxyphenyl)propane(bisphenol A), 2,2-bis(3-methyl-4-hydroxyphenyl)propane, 2,2-bis(2-methyl-4-hydroxyphenyl)propane, 2,2-bis(3,5-dimethyl-4-hydroxyphenyl)propane, 1,1-bis(2-tertiary-butyl-4-hydroxy-5-methylphenyl)propane, 2,2-bis(3-chloro-4-hydroxyphenyl)propane, 2,2-bis(3-fluoro-4-hydroxyphenyl)propane, 2,2-bis(3-bromo-4-hydroxyphenyl)propane, 2,2-bis(3,5-difluoro-4-hydroxyphenyl)propane, 2,2-bis(3,5-dichloro-4-hydroxyphenyl)propane, 2,2-bis(3,5-dibromo-4-hydroxyphenyl)propane, 2,2-bis(4-hydroxyphenyl)butane, 2,2-bis(4-hydroxyphenyl)octane, 2,2-bis(4-hydroxyphenyl) phenyl methane, 2,2-bis(4-hydroxy-1-methylphenyl)propane, 1,1-bis(4-hydroxy-tertiary-butylphenyl)propane, 2,2-bis(4-hydroxy-3-bromophenyl)propane, 2,2-bis(4-hydroxy-3,5-dimethylphenyl)propane, 2,2-bis(4-hydroxy-3,5-dimethylphenyl)propane, 2,2-bis(4-hydroxy-3-chlorophenyl)propane, 2,2-bis(4-hydroxy-3,5-dichlorophenyl)propane, 2,2-bis(4-hydroxy-3,5-dibromophenyl)propane, 2,2-bis(4-hydroxy-3,5-dibromophenyl)propane, 2,2-bis(3-bromo-4-hydroxy-5-chlorophenyl)propane, 2,2-bis(3-phenyl-4-hydroxyphenyl)propane, 2,2-bis(4-hydroxyphenyl)butane, 2,2-bis(3-methyl-4-hydroxyphenyl)butane, 1,1-bis(2-butyl-4-hydroxy-5-methylphenyl)butane, 1,1-bis(2-tertiary-butyl-4-hydroxy-5-methylphenyl)butane, 1,1-bis(2-tertiary-butyl-4-hydroxy-5-methylphenyl)isobutane, 1,1-bis(2-tertiary-amyl-4-hydroxy-5-methylphenyl)butane, 2,2-bis(3,5-dichloro-4-hydroxyphenyl)butane, 2,2-bis(3,5-dibromo-4-hydrophenyl)butane, 4,4-bis(4-hydroxyphenyl)heptane, 1,1-bis(2-tertiary-butyl-4-hydroxy-5-methylphenyl)heptane, 2,2-bis(4-hydroxyphenyl)octane, 1,1-(4-hydroxyphenyl)ethane, and the like, and mixtures thereof.

Examples of bis(hydroxyaryl)cycloalkanes include without limitation 1,1-bis(4-hydroxyphenyl)cyclopentane, 1,1-bis(4-hydroxyphenyl)cyclohexane, 1,1-bis(3-methyl-4-hydroxyphenyl)cyclohexane, 1,1-bis(3-cyclohexyl-4-hydroxyphenyl)cyclohexane, 1,1-bis(3-phenyl-4-hydroxyphenyl)cyclohexane, 1,1-bis(4-hydroxyphenyl)-3,5,5-trimethylcyclohexane, and the like, and mixtures thereof.

Examples of bis(hydroxyaryl)ethers include without limitation bis(4-hydroxyphenyl)ether, bis(4-hydroxy-3-methylphenyl)ether, and the like, and mixtures thereof.

Examples of bis(hydroxyaryl)sulfides include without limitation bis(4-hydroxyphenyl)sulfide, bis(3-methyl-4-hydroxyphenyl)sulfide, and the like, and mixtures thereof.

Examples of bis(hydroxyaryl)sulfoxides include without limitation bis(hydroxyphenyl)sulfoxide, bis(3-methyl-4-hydroxyphenyl)sulfoxide, bis(3-phenyl-4-hydroxyphenyl)sulfoxide, and the like, and mixtures thereof.

Examples of biphenyl compounds include without limitation bis(hydroxyaryl)sulphones such as bis(4-hydroxyphenyl)sulphone, bis(3-methyl-4-hydroxyphenyl)sulphone, or bis(3-phenyl-4-hydroxyphenyl)sulphone, 4,4'-dihydroxybiphenyl, 4,4'-dihydroxy-2,2'-dimethylbiphenyl, 4,4'-dihydroxy-3,3'-dimethylbiphenyl, 4,4'-dihydroxy-3,3'-dicyclobiphenyl, 3,3-difluoro-4,4'-dihydroxy biphenyl, and the like, and combinations thereof.

Examples of aromatic dihydroxy compounds (a1) which may be used in addition to the compounds represented by Chemical Formula 1 may include without limitation dihydroxybenzene, halogen- and/or C1-C4 alkyl-substituted dihydroxybenzene, and the like, and mixtures thereof. Specific examples of such aromatic dihydroxy compounds may include without limitation resorcinol, 3-methylresorcinol, 3-ethylresorcinol, 3-propylresorcinol, 3-butylresorcinol, 3-tertiary-butylresorcinol, 3-phenylresorcinol, 2,3,4,6-tetrafluororesorcinol, 2,3,4,6-tetrabromoresorcinol, catechol, hydroquinone, 3-methylhydroquinone, 3-ethylhydroquinone, 3-propylhydroquinone, 3-butylhydroquinone, 3-tertiary-butylhydroquinone, 3-phenylhydroquinone, 3-cumylhydroquinone, 2,5-dichlorohydroquinone, 2,3,5,6-tetramethylhydroquinone, 2,3,5,6-tetra-tertiary-butylhydroquinone, 2,3,5,6-tetrafluorohydroquinone, 2,3,5,6-tetrabromohydroquinone and the like, and mixtures thereof.

In exemplary embodiments, the aromatic dihydroxy compound (a1) may include 2,2-bis(4-hydroxyphenyl)propane (bisphenol A).

(a2) Carbonate Precursor

Examples of the carbonate precursor include without limitation dimethyl carbonate, diethyl carbonate, dibutyl carbonate, dicyclohexyl carbonate, diphenyl carbonate, ditolyl carbonate, bis(chlorophenyl)carbonate, m-cresyl carbonate, dinaphthyl carbonate, bis(diphenyl)carbonate, carbonyl chloride (phosgen), triphosgen, diphosgen, carbonyl bromide, bishaloformate, and the like. These compounds may be used alone, or in mixture of two or more.

The carbonate precursor (a2) may be used in a mole ratio of about 0.9 to about 1.5 relative to 1 mol of an aromatic dihydroxy compound (a1).

The polycarbonate resin (A) of the present invention may have a weight average molecular weight of about 10,000 g/mol to about 200,000 g/mol, for example about 15,000 g/mol to about 80,000 g/mol.

The polycarbonate resin composition may include the polycarbonate resin (A) in an amount of about 88 wt % to about 98 wt %, based on the total weight (100 wt %) of the polycarbonate resin composition. In some embodiments, the polycarbonate resin composition may include the polycarbonate resin (A) in an amount of about 88, 89, 90, 91, 92, 93, 94, 95, 96, 97, or 98 wt %. Further, according to some embodiments of the present invention, the amount of the polycarbonate resin (A) can be in a range from about any of the foregoing amounts to about any other of the foregoing amounts.

If the polycarbonate resin composition includes the polycarbonate resin (A) in an amount less than about 88 wt %, impact resistance, thermal stability and/or moldability may be lowered.

(B) Syndiotactic Polystyrene

Polystyrene is generally classified as atactic, isotactic and syndiotactic, depending on the position of a benzene ring which is a side chain. In atactic polystyrene, the benzene rings are irregularly arranged, and in isotactic polystyrene, the benzene rings are arranged on one side of the backbone of the polymer. Meanwhile, in syndiotactic polystyrene, the benzene rings are alternatively and regularly arranged.

Among these, syndiotactic polystyrene may be prepared from styrene monomers using a catalyst system including metallocene catalyst and cocatalyst. The metallocene catalyst has one or two cycloalkane dienyl groups (cyclopentadienyl group, indenyl group, fluorenyl group and their derivatives) linked to a transition metal complex of group IV in the periodic table such as titanium (Ti), zirconium (Zr) and hafnium (Hf).

As a related art as to polystyrene having high stereoregularity, high melting point, and good molecular weight distribution, U.S. Pat. No. 6,010,974 discloses a novel alkyl-bridged dinuclear metallocene catalyst, a silyl-bridged dinuclear metallocene catalyst, and a polymerization method of styrene monomers using alkyl-silyl bridged dinuclear metallocene catalyst.

Meanwhile, U.S. Pat. No. 6,284,700 discloses novel syndiotactic polystyrene using a catalyst system consisting of a metallocene catalyst and a cocatalyst.

In exemplary embodiments, the syndiotactic polystyrene can have a syndiotacticity of about 97% or more. In this case, chemical resistance may be excellently maintained.

The polycarbonate resin composition may include the syndiotactic polystyrene in an amount of about 1 wt % to about 10 wt %, for example about 1 wt % to about 5 wt %, based on the total weight (100 wt %) of the polycarbonate resin composition. In some embodiments, the polycarbonate resin composition may include the syndiotactic polystyrene in an amount of about 1, 2, 3, 4, 5, 6, 7, 8, 9, or 10 wt %. Further, according to some embodiments of the present invention, the amount of the syndiotactic polystyrene can be in a range from about any of the foregoing amounts to about any other of the foregoing amounts.

If the polycarbonate resin composition includes the syndiotactic polystyrene in an amount less than about 1 wt %, the effect may be insignificant, and if it is used in an amount of greater than about 10 wt %, impact resistance and/or fatigue resistance may be lowered.

(C) Modified Olefin Compound

The polycarbonate resin composition of the present invention may include modified olefin compound including a polar functional group on a polyolefin backbone. In this case, chemical resistance may be dramatically improved through combining with other components, while impact resistance, fatigue resistance, thermal stability, weathering resistance and/or moldability may be also improved.

The polyolefin backbone may include polyethylene, polypropylene, and/or ethylene-propylene copolymer.

The polyolefin backbone can be linear. In exemplary embodiments, linear polyethylene, linear low density polyethylene, ultra-low linear polyethylene, or a mixture thereof may be used.

The modified olefin compound may include a carboxyl group derived from a monomer such as acrylic acid, methacrylic acid, acrylonitrile, maleic acid and the like, and mixtures thereof as a polar functional group. In exemplary embodiments, the modified olefin compound may include any one or more monomers selected from the group consisting of acrylic acid, methacrylic acid, acrylonitrile, maleic acid, acid anhydrides thereof, and mixtures thereof on the polyolefin backbone.

Other examples of the monomers may include without limitation alkylacrylates such as methylacrylate, ethylacrylate, propylacrylate, isopropylacrylate, butylacrylate, isobutylacrylate, heptylacrylate, isooctylacrylate, 2-ethylhexylacrylate and isodecylacrylate, alkylmethacrylates such as methylmethacrylate, ethylmethacrylate, propylmethacrylate, isopropylmethacrylate, butylmethacrylate, t-butylmethacrylate, pentylmethacrylate, hexylmethacrylate, 2-ethylhexylmethacrylate, octylmethacrylate, decylmethacrylate, dodecylmethacrylate and isobornylmethacrylate, and the like, and mixtures thereof.

In exemplary embodiments, the modified olefin compound can be formed by grafting methylacrylate and/or ethylacrylate on a linear polyolefin backbone.

The modified olefin compound may include one or more monomers in an amount of about 25 wt % to about 35 wt %, based on the total weight of the modified olefin compound. In some embodiments, the modified olefin compound may include one or more monomers in an amount of about 25, 26, 27, 28, 29, 30, 31, 32, 33, 34, or 35 wt %. Further, according to some embodiments of the present invention, the amount of the monomer(s) can be in a range from about any of the foregoing amounts to about any other of the foregoing amounts.

Further, the modified olefin compound may have a flow index of about 1 g/10 min to about 5 g/10 min, for example about 2 g/10 min to about 4 g/10 min (190° C., 2.16 kg). Further, it may have a specific gravity of about 0.9 to about 1.0, and a melting point of about 65° C. to about 100° C.

The modified olefin compound including one or monomers within the above range may further enhance compatibility with polycarbonate, flow index, specific gravity, and/or melting point, relieve the concentration of stress, and/or improve flowability, so as to bring a synergistic effect of overall physical properties including impact strength resistance.

The polycarbonate resin composition may include the modified olefin compound including a polar functional group on the polyolefin backbone in an amount of about 0.1 wt % to about 2.5 wt %, based on the total weight (100 wt %) of the polycarbonate resin composition. In some embodiments, the polycarbonate resin composition may include the modified olefin compound in an amount of about 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, or 2.5 wt %. Further, according to some embodiments of the present invention, the amount of the modified olefin compound can be in a range from about any of the foregoing amounts to about any other of the foregoing amounts.

If the polycarbonate resin composition includes the modified olefin compound in an amount of less than about 0.1 wt %, the effect may be insignificant, and if the polycarbonate resin composition includes the modified olefin compound in an amount of more than about 2.5 wt %, impact resistance and fatigue resistance may be lowered.

(D) Core-Shell Graft Copolymer

The present invention may further include core-shell graft copolymer (D) in which a vinyl monomer is grafted on a rubber core as a shell component.

The core-shell structure of the core-shell graft copolymer (D) can be formed by polymerizing one or more compounds, such as but not limited to diene-based rubbers having 4 to 6 carbon atoms, acrylate-based rubbers, silicone-based rubber monomers, and the like, and mixtures thereof, and then grafting one or more unsaturated compounds capable of grafting on the rubber. Examples of unsaturated compounds capable of grafting include without limitation $C_1$-$C_8$ methacrylic acid alkyl esters, $C_1$-$C_8$ methacrylic acid esters, maleic anhydride, $C_1$-$C_4$ alkyl or/and phenyl N-substituted maleimides, and the like, and mixtures thereof. In this case, the rubber content may be about 50 to about 90 parts by weight based on about 100 parts by weights of the core-shell graft copolymer (D).

The acrylate-based rubber may include one or more acrylate monomers. Examples of acrylate monomers may include without limitation methylacrylate, ethylacrylate, n-propylacrylate, n-butylacrylate, 2-ethylhexylacrylate, hexylmethacrylate, 2-ethylhexylmethacrylate, and the like, and mixtures thereof. A curing agent may be used, and examples thereof may include without limitation ethyleneglycolmethacrylate, propyleneglycolmethacrylate, 1,3-butyleneglycolmethacrylate, 1,4-butyleneglycolmethacrylate, allylmethacrylate, triallylcyanurate, and the like, and mixtures thereof.

The silicone-based rubber may be prepared from one or more cyclosiloxanes. Examples of the cyclosiloxanes may include without limitation hexamethylcyclotrisiloxane, octamethylcyclotrisiloxane, decamethylcyclotrisiloxane, dodecamethylcyclotrisiloxane, trimethyltriphenylcylcyclotrisiloxane, tetramethyltetraphenylcyclotetrasiloxane, octaphenylcyclotetrasiloxane, and the like, and mixtures thereof. A curing agent may be used, and examples thereof may include without limitation trimetoxymethylsilane, triethoxyphenylsilane, tetramethoxysilane, tetraethoxysilane, and the like, and mixtures thereof.

Among those rubbers, if silicone rubber, or silicone-based rubber mixed with acrylate-based rubber is used, a synergistic effect in chemical resistance and thermal stability may be represented due to a structural stabilization. In this case, the rubber may have an average particle size of about 0.4 μm to about 1 μm for the maintenance of balance between impact resistance and coloring.

The above-referenced $C_1$-$C_8$ methacrylic acid alkyl esters or $C_1$-$C_8$ acrylic acid alkyl esters are esters of acrylic acid or methacrylic acid with monohydryl alcohols having 1 to 8 carbons, respectively. Examples thereof may include without limitation methacrylic acid methyl ester, methacrylic acid ethyl ester, methacrylic acid propyl ester and the like, and mixtures thereof. Methacrylic acid methyl ester may be used in exemplary embodiments.

The polycarbonate resin composition may include the core-shell graft copolymer in an amount of about 1 wt % to about 10 wt %, for example about 2 wt % to about 6 wt %, based on the total weight (100 wt %) of the composition. In some embodiments, the polycarbonate resin composition may include the core-shell graft copolymer in an amount of about 1, 2, 3, 4, 5, 6, 7, 8, 9, or 10 wt %. Further, according to some embodiments of the present invention, the amount of the core-shell graft copolymer can be in a range from about any of the foregoing amounts to about any other of the foregoing amounts.

If the polycarbonate resin composition includes the core-shell graft copolymer in an amount less about 1 wt %, the effect of reinforcing impact may be insignificant, and if the polycarbonate resin composition includes the core-shell graft copolymer in an amount more than about 10 wt %, flowability and coloration may be lowered.

The thermoplastic resin composition according to the present invention may be prepared by mixing the components by a known mixing method using an extruder, a kneader, a mixer, or the like, and then it may be extruded into a pellet form or various molded bodies.

The thermoplastic resin composition of the present invention may further include one or more additives. Examples of the additive include without limitation antimicrobial agents, thermal stabilizers, antioxidants, release agents, light stabilizers, inorganic additives, surfactants, coupling agents, plasticizers, compatibilizers, lubricants, antistatic agents, coloring agents, such as pigments and/or dyes, flame retardants, flame retardant aids, anti-dripping agents, weathering agents, ultraviolet absorbents, sunscreens, and the like, and mixtures thereof.

Chemical resistance in the present invention may be confirmed, after coating a reagent product (chemical product) on a specimen, and drying, through the number of repeated stress when final fatigue fracture is generated (the number of repeated stress at fatigue fracture) obtained by repeatedly applying stress of about 1400N at about 5 times per second to a tensile specimen in its longitudinal direction, or through the first time when a crack is generated on the center of the specimen (crack generation time) after fixing a tensile specimen to a semi-circular jig having a gradient.

In this case, the resin composition of the present invention may have a number of repeated stress at fatigue fracture of about 4,500 times to about 6,500 times, and crack generation time of about 60 minutes to about 80 minutes.

The resin composition of the present invention may be used to mold articles in various fields, such as portable electronic devices, for example, a smart phone, a digital camera, and the like.

Hereinafter, the following Examples will be provided in order to describe the present invention in more detail. However, the present invention is not limited to the Examples below.

Each of the component specifications used in the following Examples and Comparative Examples is as follows:

(A) Polycarbonate Resin

INFINO (Melt Index (250° C., 10 kg)=93 g/10 min) which is polycarbonate from Cheil Industries, Co., Ltd., Korea is used.

(B) Syndiotactic Polystyrene Resin

Syndiotactic polystyrene XAREC 5100 having melting point of 250° C., glass transition temperature of 100° C., and specific gravity of 1.01, from IDEMITSU, Japan is used.

(C) Modified Olefin Compound

Lotryl (Melt Index (190° C., 2.16 kg)=3 g/10 min, MA content: 30 wt %, specific gravity: 0.95, melting point: 85° C.) from Arkema is used as polyethylene methylacrylate.

(D) Core-Shell Graft Copolymer

Metablen S 2100 from Mitsubishi Rayon, which is a core-shell graft copolymer in which methylmethacrylate monomers are grafted on a rubber consisting of dimethylsiloxane having an average particle size of 0.5 μm and butylacrylate, is used.

Example 1

As described in following Table 1, 97.7 wt % of a polycarbonate resin, 2 wt % of syndiotactic polystyrene, and 0.3 wt % of polyethylene methylacrylate are mixed in a general mixer to form a mixture, and the mixture is extruded at 250 to 260° C. using a twin screw extruder with L/D=35 and Φ=45 mm to prepare a pellet.

The prepared pellet is dried in air current dryer at 110° C. for 3 hours or more before injection-molded, then molded into a specimen for measuring physical properties using a 10 oz injector at injection temperature of 230° C. According to the following methods for measuring physical properties, the prepared specimen is used to measure physical properties, and the results are shown in following Table 2.

Examples 2 and 3

These are prepared in the same manner as in Example 1, except for varying the amounts of each component, as shown in following Table 1.

Example 4

This is prepared in the same manner as in Example 1, except for further including a core-shell graft copolymer, and accordingly varying the amounts of components, as shown in following Table 1.

Comparative Example 1

This is prepared in the same manner as in Example 1, except for excluding syndiotactic polystyrene and polyethylene methylacrylate, as shown in following Table 1.

Comparative Example 2

This is prepared in the same manner as in Example 1, except for varying the amounts of polycarbonate and syndiotactic polystyrene, and excluding polyethylene methylacrylate, as shown in following Table 1.

Comparative Example 3

This is prepared in the same manner as in Example 1, except for varying the amounts of polycarbonate and polyethylene methylacrylate, and excluding syndiotactic polystyrene, as shown in following Table 1.

Comparative Example 4

This is prepared in the same manner as in Example 1, except for varying the amount of each component including the amount of polyethylene methylacrylate (3 wt %), as shown in following Table 1.

(Measurement of Physical Properties)

1) Number of Repeated Stress at Fatigue Fracture

This is measured by applying Nivea Sun Aqua protect (SPF 30) product on a specimen using a brush, and then carrying out a fatigue fracture test by repeatedly applying a stress of 1400N at 5 times/sec to a tensile specimen in its longitudinal direction, and recording the number of repeated stress when final fatigue fracture is generated (Cheil Method).

2) Crack Generation Time (Min.)

This is measured by fixing an Injection-molded tensile specimen to a semi-circular jig having a gradient, then applying Nivea Sun Aqua protect (SPF 30) product on the specimen and leaving the specimen for a while, and recording the time taken until a crack is generated on the center of the specimen (Cheil Method).

3) Color Difference on Weld Region

Color difference on weld part of a flat rectangular specimen injected with a 2 gate mold is visually observed.

TABLE 1

|  | Examples | | | | Comparative Examples | | | |
| --- | --- | --- | --- | --- | --- | --- | --- | --- |
|  | 1 | 2 | 3 | 4 | 1 | 2 | 3 | 4 |
| (A) Polycarbonate | 97.7 | 98 | 95.5 | 93.5 | 100 | 93 | 96 | 94 |
| (B) Syndiotactic polystyrene | 2 | 1.5 | 3 | 1.5 | — | 7 | — | 3 |
| (C) Polyethylene methylacrylate | 0.3 | 0.5 | 1.5 | 1 | — | — | 4 | 3 |
| (D) Core-shell graft copolymer | — | — | — | 4 | — | — | — | — |

TABLE 2

|  | Examples | | | | Comparative Examples | | | |
| --- | --- | --- | --- | --- | --- | --- | --- | --- |
|  | 1 | 2 | 3 | 4 | 1 | 2 | 3 | 4 |
| Number of repeated stress at fatigue fracture | 4500 | 5200 | 6000 | 6300 | 1800 | 3800 | 4700 | 7500 |
| Crack generation time (min.) | 60 | 68 | 80 | 75 | 20 | 35 | 55 | 77 |
| color difference on weld region | good | good | good | good | color difference | color difference | color difference | color difference |

As seen in above Table 2, Examples 1 to 3 according to the present invention represent good chemical resistance properties as compared with Comparative Examples, while having excellent fatigue resistance, impact resistance and moldability. In addition, Example 4 shows increased fatigue resistance by further including core-shell graft copolymer. In contrast, Comparative Examples 1 to 3 do not contain syndiotactic polystyrene or polyethylene methylacrylate, and show the problems of significantly inferior chemical resistance properties, and color difference.

The polycarbonate resin composition of the present invention can have the advantages of not only excellent impact resistance, thermal resistance, weathering resistance, scratch resistance, mechanical properties, and transparency, but also dramatically improved chemical resistance so as to represent long term stability of physical properties while preventing the degradation of physical properties by chemical products.

The composition of the present invention also can have the advantage of preventing the degradation of physical properties due to local stress caused by shrinkage in molding processing.

Moreover, the composition of the present invention can have the advantage of being applied to portable electric and electronic products such as a mobile phone, since it may provide a molded body capable of enhancing chemical resistance, impact resistance, fatigue resistance, thermal stability, and weathering resistance when applied to exterior material which is frequently exposed to external environment and frequent touch, and vulnerable to fatigue.

Hereinabove, although the present invention has been described by specific exemplary embodiments, they have been provided only for assisting in the entire understanding of the present invention. Therefore, the present invention is not limited to the exemplary embodiments. Various modifications and changes may be made by those skilled in the art to which the present invention pertains from this description.

Therefore, the spirit of the present invention should not be limited to the above-described exemplary embodiments, and the following claims as well as all modified equally or equivalently to the claims are intended to fall within the scope and spirit of the invention.

What is claimed is:

1. A polycarbonate resin composition having good chemical resistance, comprising:
   (A) a polycarbonate resin,
   (B) syndiotactic polystyrene, and
   (C) a modified polyolefin compound including a polar functional group on a polyolefin backbone, wherein the modified polyolefin compound (C) has a flow index of about 1 g/10 min to about 5 g/10 min (190° C., 2.16 kg).

2. The polycarbonate resin composition having good chemical resistance of claim 1, comprising about 88% by weight to about 98% by weight of a polycarbonate resin (A), about 1% by weight to about 10% by weight of aromatic syndiotactic polystyrene (B), and about 0.1% by weight to about 2.5% by weight of a modified polyolefin compound (C) including a polar functional group on the polyolefin backbone.

3. The polycarbonate resin composition having good chemical resistance of claim 1, wherein the polyolefin backbone includes polyethylene, polypropylene, ethylene-propylene copolymer, or a mixture thereof.

4. The polycarbonate resin composition having good chemical resistance of claim 1, wherein the modified polyolefin compound (C) is formed by grafting a monomer including acrylic acid, methacrylic acid, acrylonitrile, maleic acid, maleic anhydride, alkyl acrylate, alkyl methacrylate, or a mixture thereof on the polyolefin backbone.

5. The polycarbonate resin composition having good chemical resistance of claim 4, wherein the modified polyolefin compound (C) includes the monomer in an amount of about 25 wt % to about 35 wt %.

6. The polycarbonate resin composition having good chemical resistance of claim 1, wherein the syndiotactic polystyrene (B) has a syndiotacticity of about 97% to 100%.

7. The polycarbonate resin composition having good chemical resistance of claim 1, further comprising a core-shell graft copolymer.

8. The polycarbonate resin composition having good chemical resistance of claim 7, wherein the core-shell graft copolymer includes a core formed by polymerizing a diene-based rubber having 4 to 6 carbons, an acrylate-based rubber, a silicone-based rubber monomer, or a mixture thereof, and a $C_1$-$C_8$ methacrylic acid alkyl ester, $C_1$-$C_8$ methacrylic acid ester, maleic anhydride, $C_1$-$C_4$ alkyl N-substituted maleimide, phenyl N-substituted maleimide, or a mixture thereof grafted on the core.

9. The polycarbonate resin composition having good chemical resistance of claim 1, further comprising an additive selected from the group consisting of antimicrobial agents, thermal stabilizers, antioxidants, release agents, light stabilizers, inorganic additives, surfactants, coupling agents, plasticizers, compatibilizers, lubricants, antistatic agents, coloring agents, flame retardants, flame retardant aids, anti-dripping agents, weathering agents, ultraviolet absorbents, sunscreens, and mixtures thereof.

10. A molded article manufactured from the polycarbonate resin composition of claim 1.

* * * * *